(12) United States Patent  
Harper

(10) Patent No.: US 7,209,077 B2
(45) Date of Patent: Apr. 24, 2007

(54) GLOBAL POSITIONING SYSTEM SIGNAL ACQUISITION ASSISTANCE

(75) Inventor: Neil Harper, Mangerton (AU)

(73) Assignee: Andrew Corporation, Orland Park, IL (US)

( * ) Notice: Subject to any disclaimer, the term of this patent is extended or adjusted under 35 U.S.C. 154(b) by 139 days.

(21) Appl. No.: 10/980,476

(22) Filed: Nov. 3, 2004

(65) Prior Publication Data

US 2005/0285783 A1    Dec. 29, 2005

(51) Int. Cl.
G01S 5/14    (2006.01)

(52) U.S. Cl. .......................... 342/357.15; 342/357.09; 342/357.1

(58) Field of Classification Search ........... 342/357.15, 342/357.09, 357.1
See application file for complete search history.

(56) References Cited

U.S. PATENT DOCUMENTS

| 6,204,808 | B1 | 3/2001 | Bloebaum |
| 6,295,023 | B1 | 9/2001 | Bloebaum |
| 6,295,449 | B1 | 9/2001 | Westerlage |
| 6,351,235 | B1 | 2/2002 | Stilp |
| 6,466,164 | B1 | 10/2002 | Akopian |
| 6,771,629 | B1 | 8/2004 | Preston et al. |
| 6,889,053 | B1 | 5/2005 | Chang et al. |
| 2002/0069076 | A1 | 6/2002 | Faris et al. |
| 2002/0175855 | A1 | 11/2002 | Richton et al. |
| 2003/0069694 | A1 | 4/2003 | Fuchs et al. |
| 2003/0129992 | A1 | 7/2003 | Koorapaty et al. |
| 2004/0203717 | A1 | 10/2004 | Wingrowicz et al. |
| 2004/0203885 | A1 | 10/2004 | Quaid |
| 2004/0239558 | A1* | 12/2004 | Geier et al. .............. 342/357.1 |
| 2005/0059415 | A1 | 3/2005 | Easo et al. |

OTHER PUBLICATIONS

GSM: 3rd Generation Partnershipp Project, release 1999, 3GPP TS 04.35 V8.4.1, pp. 1-35.

* cited by examiner

Primary Examiner—Thomas H. Tarcza
Assistant Examiner—F H Mull
(74) Attorney, Agent, or Firm—Duane Morris LLP

(57) ABSTRACT

There is disclosed a method of determining a code phase search window for use by a satellite positioning system receiver associated with a mobile terminal of a communications network when acquiring a signal from a satellite of a satellite positioning system.

62 Claims, 10 Drawing Sheets a: Ellipse major Axis
b: Ellipse minor Axis
az: Azimuth of the satellite
Φ: The major angle of the ellipse
$(x_1, y_1)$ the point on the ellipse at the minimum distance between the ellipse and the satellite
$(x_2, y_2)$ the point on the ellipse at the maximum distance between the ellipse and the satellite
$d_1$: The distance between the boundary of the ellipse closest to the satellite and the satellite
$d_2$: The distance between the boundary of the ellipse farthest from the satellite and the satellite

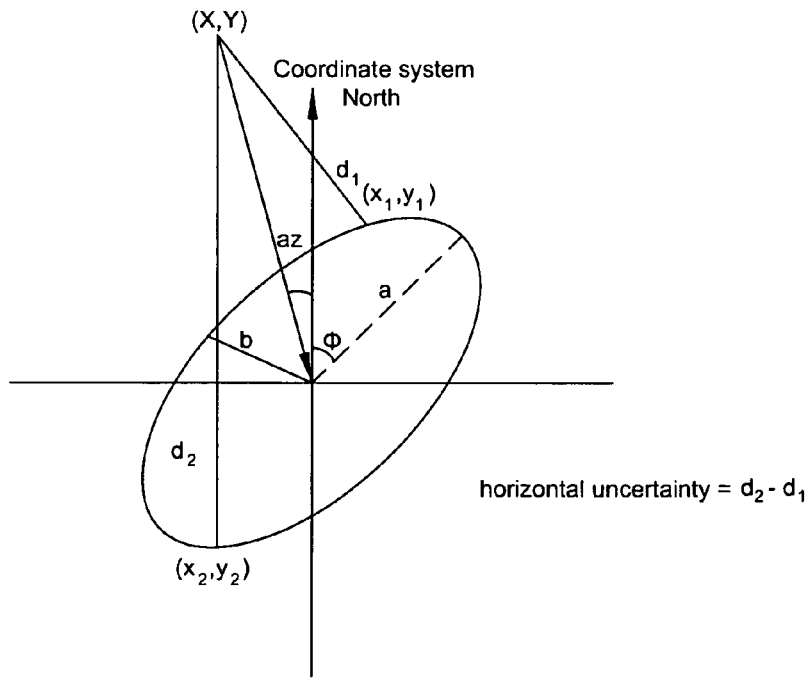

FIG. 3 a: Ellipse major Axis
b: Ellipse minor Axis
az: Azimuth of the satellite
Φ: The major angle of the ellipse
$(x_1, y_1)$ the point on the ellipse at the minimum distance between the ellipse and the satellite
$(x_2, y_2)$ the point on the ellipse at the maximum distance between the ellipse and the satellite
$d_1$: The distance between the boundary of the ellipse closest to the satellite and the satellite
$d_2$: The distance between the boundary of the ellipse farthest from the satellite and the satellite
$d_3 = (d_2 - d_1)/2$
$d_4 = (d_1 + d_3)/2$

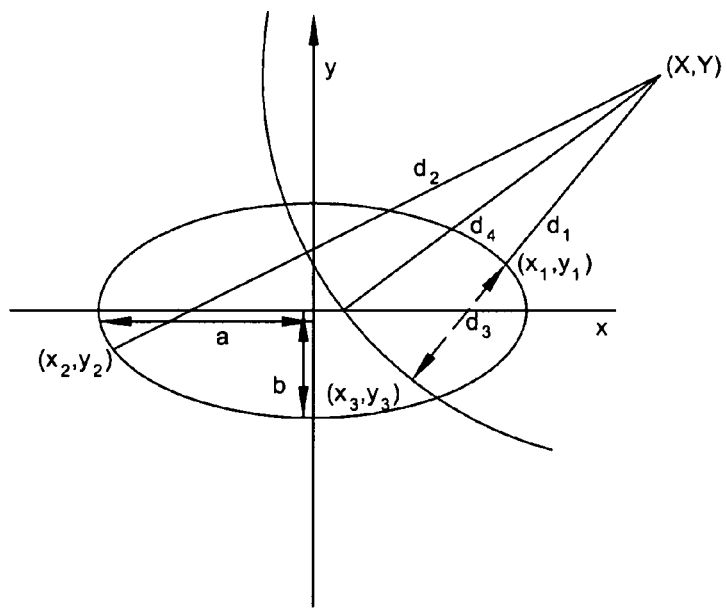

FIG. 4

GLOBAL POSITIONING SYSTEM SIGNAL ACQUISITION ASSISTANCE

FIELD OF THE INVENTION

The present invention relates to satellite positioning system signal acquisition assistance. In particular the present invention relates a method for providing assistance data to an assisted satellite positioning system handset operating in a cellular telecommunications network.

BACKGROUND OF THE INVENTION

Assisted-Global Positioning System (A-GPS) has emerged as a strong candidate for providing accurate location determination for mobile terminals operating in wireless telecommunications networks. In addition to the hardware typically associated with mobile handsets in a radio telecommunications network an A-GPS equipped mobile terminal has a satellite positioning system receiver (or partial satellite positioning system receiver) configured to determine the location of the handset. The satellite positioning system receiver relies on the wireless communications network to communicate so called "assistance data" to the mobile station to improve, inter alia, positioning sensitivity, signal acquisition time, accuracy, and battery consumption without requiring additional hardware.

By providing assistance data to an A-GPS receiver weaker signals can be detected, thereby making it possible in some instances to obtain a location fix for the A-GPS receiver where it would not have been possible with a traditional GPS receiver.

Another advantages of A-GPS over conventional satellite positioning system receivers is the reduced time to first fix realised by A-GPS receivers. However, particularly for emergency calls (e.g. E911 and E112) it is desirable that this time be further reduced.

One of the key ways to improve the sensitivity of an A-GPS handset, and potentially decrease the time to first fix, is by providing signal acquisition assistance data to the handset. In use a satellite positioning system receiver detects a satellite signal by correlating the received signal with a locally-generated copy of the signal. Each of the signals comprises a repeating 1023 bit (chip) pseudorandom code and the offset between their respective phases represents a measure of the range between the satellite and the A-GPS handset.

Without assistance data the satellite positioning system receiver must search the entire space of possible satellites, frequency offsets and code delays to attempt to find a match between a received signal and a locally generated signal and to thereby determine the range of the receiver from the satellite.

FIGS. 1A and 1B of the accompanying drawings represent the search space for a satellite positioning system receiver. FIG. 1A represents a full three-dimensional search space 100 for a satellite positioning system receiver comprising a group of two-dimensional search spaces 102*a* . . . 102*f*. Each of the two-dimensional search spaces corresponds to a particular satellite in the satellite positioning system constellation One of the key pieces of assistance data provided to an A-GPS mobile terminal is an indication of those satellites in the satellite positioning system constellation from which the mobile terminal should be able to acquire a signal. This assistance data limits the three dimensional search space to a reduced set of search spaces, each of which should yield a code phase match for a received satellite signal.

FIG. 1B shows the two-dimensional search space (e.g. 102*a* of FIG. 1A) for a particular satellite in the satellite positioning system constellation from which the A-GPS receiver should be able to acquire a signal. The search space 102*a* for the satellite is divided into a plurality of "bins" 104 which represent discrete frequency and code delay increments through which the A-GPS receiver must search to obtain a code phase correlation as detailed above.

The code phase search space for a given signal is determined by the possible range of signal travel times between the satellite that transmitted the signal and the satellite positioning system receiver. For example, satellite positioning system satellites orbit the earth at approximately 20,180 km above its surface. The travel time of a signal transmitted from a satellite at zenith is 76 milliseconds, and for a satellite on the horizon is 86 milliseconds. Accordingly, there is a 19 millisecond window in which the signal from any given satellite can be received depending on its position in the sky relative to the A-GPS receiver. As the chipping rate of a global positioning system signal is 1023 kilohertz this corresponds to a maximum code phase search window in the order of 19,000 bits.

By estimating the position of the A-GPS terminal and assigning an associated accuracy the possible range between the A-GPS terminal and the satellite is reduced. This results in a reduced code phase search window which can be communicated to the A-GPS terminal as assistance data in an attempt to reduce the time spent by the terminal looking for a code phase match for a received signal. As will be appreciated by those skilled in the art a reduction in the range of possible Doppler frequencies may also be made and communicated to the A-GPS terminal as assistance data. Thus rather than the A-GPS terminal having to search for a signal over the whole two dimensional search space 102*a* shown in FIG. 1B the search region can be reduced to the code phase search region indicated by reference numeral 106 in FIG. 1B.

The present inventor has recognised that a smaller search window can be provided to an A-GPS handset by reducing the code phase range over which the search must be performed.

SUMMARY OF THE INVENTION

In a first aspect there is provided a method of determining a code phase search window for use by a satellite positioning system receiver associated with a mobile terminal of wireless communications network when acquiring a signal from a satellite of a satellite positioning system, including:

determining an approximate position of the satellite positioning system receiver having an non-circular position uncertainty region associated therewith;

determining a minimum range to the satellite for a mobile terminal within the position uncertainty region;

determining a maximum range to the satellite for a mobile terminal within the position uncertainty region;

determining a code phase search window for use by the satellite positioning system receiver that includes a code phase interval encompassing code phase values corresponding to the minimum and maximum ranges to the satellite.

The method can include deriving at least one of the approximate position of the satellite positioning system receiver, and the non-circular position uncertainty region associated therewith from radio communications parameter data associated with the mobile terminal.

The method can further include, determining a point within the non-circular position uncertainty region that is closest to the satellite, and/or determining a point within the non-circular position uncertainty region that is farthest from the satellite.

The method can further include determining a midpoint for the uncertainty region which lies equidistant from the point within the non-circular position uncertainty region that is closest to the satellite and the point within the non-circular position uncertainty region that is farthest from the satellite.

The method can include determining a midpoint for the code phase search window by determining the code phase of a point having a range to the satellite that is halfway between the minimum range to the satellite and the maximum range for a mobile terminal within the uncertainty region.

The position uncertainty region is a three dimensional region. The position uncertainty region can be defined by a two dimensional position uncertainty region and a vertical position uncertainty.

In one embodiment the uncertainty region is determined on the basis of at least a transmission pattern of a transmitter of the communications network with which the mobile terminal is in communication.

The non-circular uncertainty region assigned to the approximate position can preferably be selected from a list including: an elliptical region, an ellipsoid, a polygonal region, an arc band.

A vertical uncertainty can be assigned on the basis of the topology of the two-dimensional uncertainty region.

The method can further comprise transmitting the code phase search window to the satellite positioning system receiver.

In a second aspect the present invention provides a method, in a satellite positioning system receiver associated with a mobile terminal of a wireless communications network, of determining a code phase offset between a locally generated encoded signal and an encoded signal received from a satellite of the satellite positioning system, the method comprising:

comparing the phase of the locally generated encoded signal to the received signal for a plurality of the code phase offsets in a code phase search window until a phase match is identified, wherein the code phase search window is determined on the basis of an approximate position of the satellite positioning system receiver and an associated a non-circular position uncertainty region and is representative of a range of possible code phase offsets for a terminal located in said non-circular position uncertainty region.

The code phase search window can be determined by;

determining a minimum range to the satellite for a mobile terminal within the position uncertainty region;

determining a maximum range to the satellite for a mobile terminal within the position uncertainty region;

determining a code phase search widow for use by the satellite positioning system receiver that includes a code phase interval encompassing code phase values corresponding to the minimum and maximum ranges to the satellite.

The method can further include, deriving at least one of the approximate position of the satellite positioning system receiver, and the non-circular position uncertainty region associated therewith from radio communications parameter data associated with the mobile terminal.

A midpoint for the code phase search window is determined by determining the code phase of a point having a range to the satellite that is halfway between a point within uncertainty region having a minimum range to the satellite and a point within uncertainty region having a maximum range to the satellite.

The position uncertainty region can be three dimensional region.

The position uncertainty region can be defined by a two dimensional position uncertainty region and a vertical position uncertainty.

In one embodiment the uncertainty region is determined on the basis of at least a transmission pattern of a transmitter of the communications network with which the mobile terminal is in communication.

The non-circular uncertainty region assigned to the approximate position can be selected from a list including: an elliptical region, an ellipsoid, a polygonal region, an arc band.

A vertical uncertainty can be assigned on the basis of the topology of the two-dimensional uncertainty region.

Preferably the code phase search window is transmitted to the satellite positioning system receiver by the radio communications network.

In a third aspect there is provided a method of assisting a satellite positioning system receiver associated with a mobile terminal operating in a wireless communications network to determine a code phase offset between an encoded signal generated in the receiver and an encoded signal received from a satellite of the satellite positioning system, the method including:

determining, on the basis of an approximate position of the mobile terminal and an associated a non-circular uncertainty region, a code phase search window; and communicating the determined code phase search window to the receiver.

In one embodiment the code phase search window is determined by, determining a minimum range to the satellite for a mobile terminal within the position uncertainty region; determining a maximum range to the satellite for a mobile terminal within the position uncertainty region; determining a code phase search window for use by the satellite positioning system receiver that includes a code phase interval encompassing code phase values corresponding to the minimum and maximum ranges to the satellite.

The method can include deriving at least one of, the approximate position of the satellite positioning system receiver, and the non-circular position uncertainty region associated therewith from radio communications parameter data associated with the mobile terminal.

In one embodiment a midpoint for the code phase search window is determined by determining the code phase of a point having a range to the satellite that is halfway between a point within uncertainty region having a minimum range to the satellite and a point within uncertainty region having a maximum range to the satellite.

The position uncertainty region can be a three dimensional region. The position uncertainty region can be defined by a two dimensional position uncertainty region and a vertical position uncertainty.

In one embodiment the uncertainty region is determined on the basis of at least a transmission pattern of a transmitter of the communications network with which the mobile terminal is in communication.

The non-circular uncertainty region assigned to the approximate position can be selected from a list including: an elliptical region, an ellipsoid, a polygonal region, an arc band.

A vertical uncertainty can be assigned on the basis of the topology of the two-dimensional uncertainty region.

The method can further include data representative of the determined code phase search window being transmitted via the cellular telecommunications network for use by the satellite positioning system receiver.

In one embodiment the code phase search window is determined by a network element of the cellular telecommunications network.

In a further embodiment at least one of the non-circular uncertainty regions are determined for the mobile terminal by a second network element.

In another aspect the present invention provides a network element of a communications network configured to determine a code phase search window for use by a satellite positioning system receiver associated with a mobile terminal operating within the communications network, wherein the network element is configured to determine a code phase search window on the basis of an approximate position assigned to the satellite positioning system receiver having a non-circular position uncertainty region associated wherewith.

The network element can be a mobile location centre of a cellular telecommunications network.

In one embodiment the network element further includes transmission means configured to communicate data representative of the code phase search window to the satellite positioning system receiver via the communications network.

In another aspect the present invention provides a network element of a communications network including;

a processor configured to determine a code phase search window for use by a satellite positioning system receiver associated with a mobile terminal operating within the communications network, the processor being configured to determine a code phase search window on the basis of:

an approximate position assigned to the satellite positioning system receiver;

a non-circular position uncertainty region associated with the approximate position; and transmission means configured to transmit data representative of the code phase search window to the mobile terminal via the communications network.

The network element can further include reception means configured to receive data from the communication network from which the approximate position assigned to the satellite positioning system receiver and a non-circular position uncertainty region can be derived.

The network element can further include memory means configured to store thereon a database structure including vertical position uncertainty data useable by the processor to determine a code phase search window for a mobile terminal.

In one embodiment the network element is a mobile location centre of a cellular telecommunications network.

In yet another aspect the present invention provides a method of determining a code phase search window for use by a satellite positioning system receiver associated with a mobile terminal of wireless communications network when acquiring a signal from a satellite of a satellite positioning system, wherein the code phase search window is determined based on an approximate position of the satellite positioning system receiver and an associated non-circular uncertainty region surrounding the approximate position.

The method can further include deriving at least one of the approximate position of the satellite positioning system receiver, and the non-circular position uncertainty region associated therewith from radio communications parameter data associated with the mobile terminal.

In one embodiment the midpoint for the code phase search window is determined by determining the code phase of a point having a range to the satellite that is halfway between the minimum range to the satellite and the maximum range for a mobile terminal within the uncertainty region.

The position uncertainty region can be a three dimensional region. In one embodiment the position uncertainty region is defined by a two dimensional position uncertainty region and a vertical position uncertainty.

The uncertainty region can be determined on the basis of at least a transmission pattern of a transmitter of the communications network with which the mobile terminal is in communication.

The non-circular uncertainty region can be assigned to the approximate position is selected from a list including: an elliptical region, an ellipsoid, a polygonal region, an arc band.

A vertical uncertainty can be assigned on the basis of the topology of the two-dimensional uncertainty region.

The method can further comprise transmitting the code phase search window to the satellite positioning system receiver.

The method can further comprise receiving data representative of at least one of, the approximate position of the satellite positioning system receiver, and the non-circular uncertainty region associated therewith.

The network element can be a mobile location centre of a cellular telecommunications network.

The present invention also extends to a communications network including such a network elements For example the network can be one of the following types of network:

Global System for Mobile (GSM) network, code-division multiple access (CDMA) network, Universal Mobile Telecommunications Service (UMTS) network.

Embodiments of the invention can also be implemented in other types of wireless communications network.

BRIEF DESCRIPTION OF THE DRAWINGS

Embodiments of the present invention will now be described by way of non-limiting example only with reference to the accompanying drawings, in which:

FIG. 3 shows a plan view of the horizontal uncertainty area for an A-GPS enabled handset in a mobile telecommunications network as used in an embodiment of the present invention;

FIG. 4 shows the same elliptical area of uncertainty as shown in FIG. 3, which has been rotated to simplify calculation of the code phase search window;

DETAILED DESCRIPTION OF THE EMBODIMENTS

The illustrative embodiments of the present invention will be described in relation to a receiver of the Global Positioning System (GPS) satellite positioning system. However, as will be appreciated the methods described herein are equally applicable to other positioning systems. Therefore, in the description the term GPS should be understood to refer to positioning systems generally. Moreover the illustrative embodiments disclosed herein describe a mobile terminal in communication with a cellular telecommunication network. However, the methods and systems disclosed herein should be understood to be applicable to any applicable wireless communication means.

The present inventor has recognised that if it is possible to use an initial estimate for the position of a satellite positioning system receiver handset having a reduced uncertainty then the size of the code phase search window can be correspondingly reduced.

For an A-GPS handset which is operating in a cellular mobile telecommunications network an additional location estimate can be provided based on the handset's location within the cellular network. This initial location estimate can be used to determine a code phase range over which the satellite positioning system receiver must search when attempting to lock onto a satellite's signal.

In one embodiment of the present invention an initial estimate of the position of the mobile handset is provided as an ellipse which can then be used to determine a maximum and minimum range to the satellite which in turn defines a code phase search window for the associated satellite positioning system receiver.

In other embodiments, the initial estimate of the position of the mobile handset is provided as one of a variety of non-circular shapes derivable from data obtained from the radio communications network.

Figure 1A:
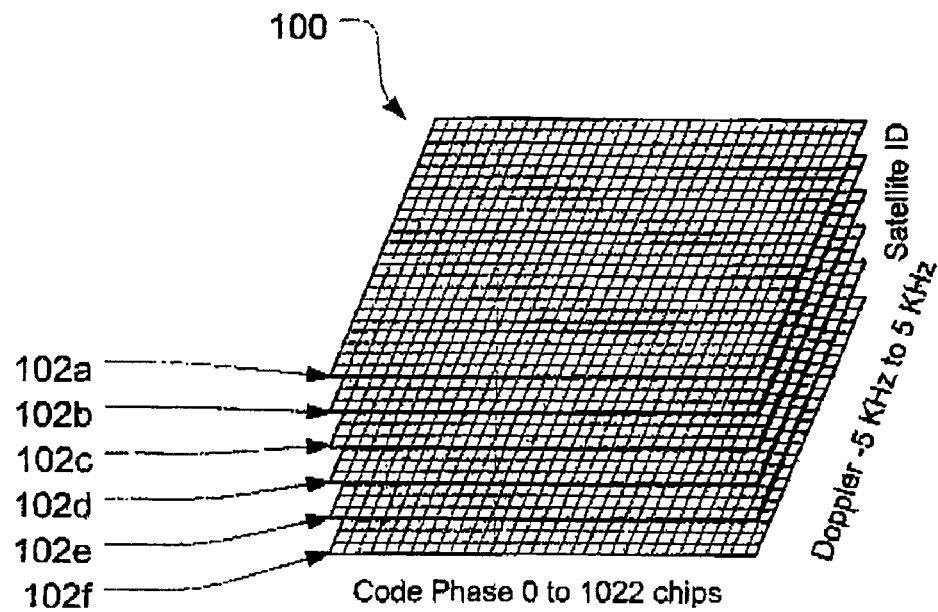
FIG. 1A shows a schematic representation of a three dimensional code phase search space for a satellite positioning system handset.
Figure 1B:
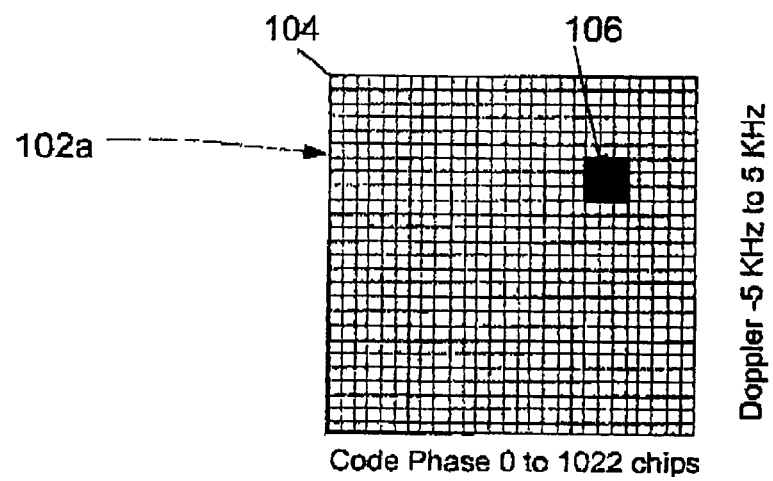
FIG. 1B shows a two dimensional code phase search space representing the code phase search space for a given satellite in a satellite positioning system satellite constellation.
Figure 2:
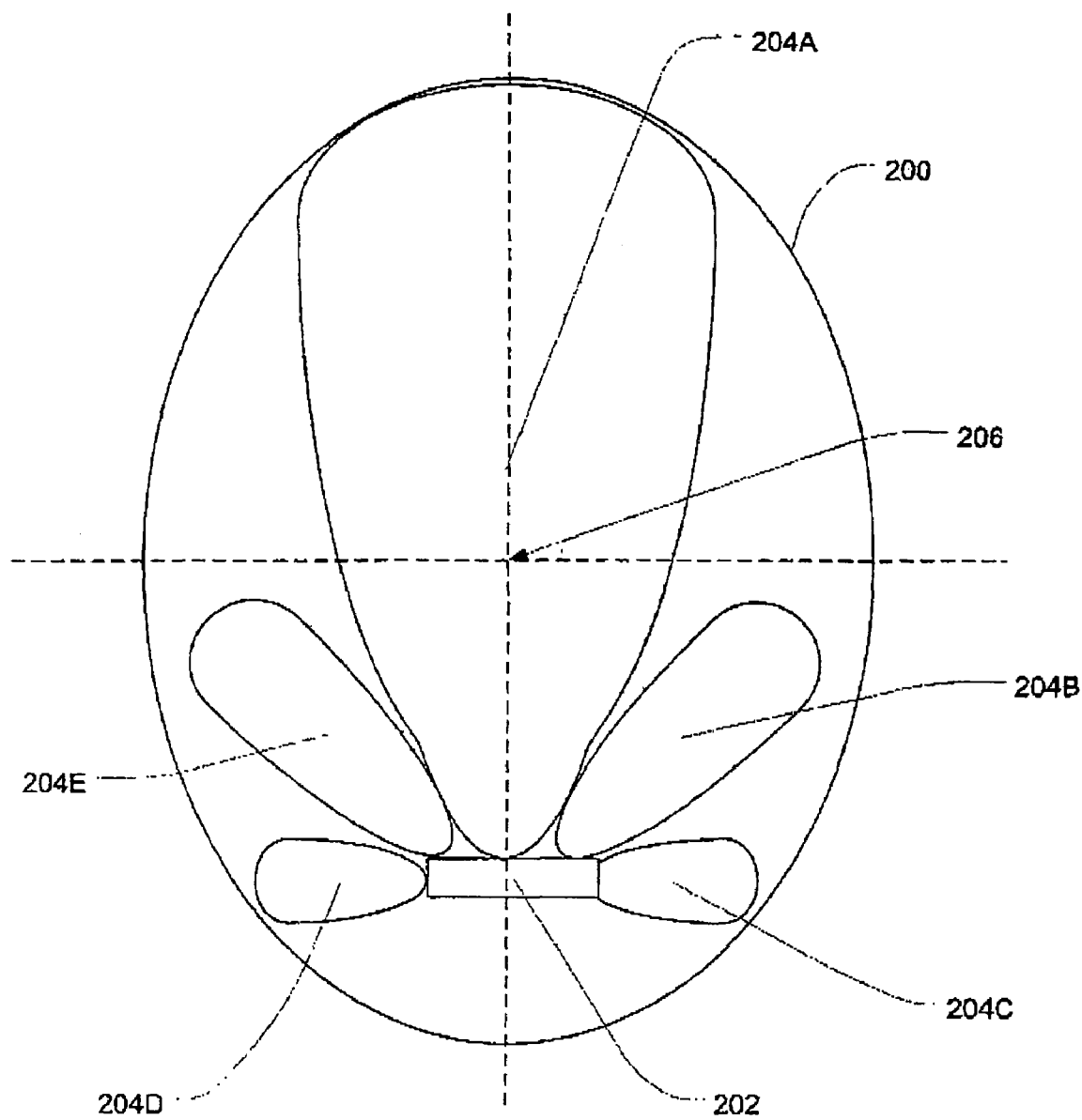
FIG. 2 shows an ellipse representing an initial position estimate for a handset in a cellular telecommunications network.

FIG. 2 depicts a schematic representation of an ellipse used in an embodiment of the invention as an initial position estimation for a mobile terminal in a cellar mobile telecommunications network. The ellipse 200, of FIG. 2 is an approximation of the size and shape of the cell of the network in which the mobile terminal is operating. The base station antenna 202 emits radiation signals in a beam pattern as illustrated by regions 204A to 204E. If the handset is within the regions 204A to 204E the signal strength from the base station antenna should be sufficient to allow communication between the handset and the base station 202.

An ellipse is inscribed around the antenna beam pattern 204A to 204E and used as an approximation of the shape of the cell and is the basis of the estimate of the position of the mobile terminal. Accordingly, if the base station transmits over a relatively narrow beam angle a more eccentric ellipse will be used. In contrast if the antenna of the mobile base station is very wide then an almost circular ellipse will be used as the basis for the initial position estimate for the mobile teal. To allow calculations to be performed the mobile terminal is assumed to lie at the centre 206 of the ellipse 200. Thus the central point of the ellipse 206 is used as the estimated position of the mobile terminal.

The horizontal uncertainty of this estimated position depends on the direction of the satellite i.e. the azimuth of the satellite, relative to the orientation of the ellipse and the size of the ellipse. For a given ellipse the largest horizontal position uncertainty for mobile terminal will occur when the satellite's azimuth lies along the major axis of the ellipse, with the horizontal uncertainty decreasing as the satellite's azimuth moves around into alignment with the ellipse's minor axis. As will be appreciated by those skilled in the art an A-GPS receiver may receive signals from a plurality of satellites at any given time. However for clarity in the figures a single satellite is shown.

FIG. 3 shows a plan view of an exemplary ellipse that has been applied to cell of a telecommunications network in which an A-GPS equipped mobile terminal is operating. As described above the mobile terminal is estimated to lie within the ellipse, in this case the horizontal uncertainty range for the terminal can be calculated as follows. In FIGS. 3 and 4 the listed variables have the following meanings:

a is the ellipse's major axis;

b is the ellipse's minor axis;

az is the azimuth of the satellite;

$\phi$ is the angle formed between the major axis of the ellipse and the reference axis;

$(x_1,y_1)$ is the point on the ellipse having the shortest distance to the satellite;

$(x_2,y_2)$ is the point on the ellipse having the longest distance to the satellite;

$d_1$ is the distance between the point $(x_1,y_1)$ and the satellite; and $d_2$ is the distance between the point $(x_2,y_2)$ and the satellite To calculate the horizontal uncertainty of this position estimate the length of line segments $d_1$ and $d_2$ are first determined and the difference between them is calculated. The minimum distance between the ellipse and the satellite is the point $(x_1,y_1)$ on the boundary of the ellipse where a line from the satellite to the ellipse is perpendicular to the ellipse. The maximum distance between the satellite on the ellipse corresponds to the other point $(x_2,y_2)$ on the boundary of the ellipse where the line is perpendicular to the ellipse.

To simplify the calculation of these quantities, the coordinate frame is rotated so that the major axis of the ellipse lies along the x axis as shown in FIG. 4. In FIG. 4 the position of the satellite is projected onto the horizontal plane of the earth at the point (X,Y) and the points $(x_1,y_1)$ and $(x_2,y_2)$ are the points where the line from the satellite to the ellipse is perpendicular to the ellipse.

As will be known by those skilled in the art the slope $s_l$ of a line from (X,Y) to a point (x,y) is given by:

$$s_l = \frac{Y-y}{X-x}$$

The general equation for the slope of an ellipse $s_e$ at point (x,y) is given by the following equation:

$$s_e = \frac{-b^2 x}{a^2 y}$$

where the equation of the ellipse is given by:

$$\frac{x^2}{a^2} + \frac{y^2}{b^2} = 1$$

Where a and b are the lengths of the major and minor axes of the ellipse respectively.

In order to find points $(x_1,y_1)$ and $(x_2,y_2)$ it is necessary to find the two points on the ellipse where the slope of the segment from (X,Y) to the point on the ellipse is the negative reciprocal of the slope of the ellipse. That is where $$\frac{Y-y}{X-x} = \frac{a^2 y}{b^2 x}$$

This equation and the equation of the ellipse can be used to solve for x and y in terms of the known values a, b, X and Y as follows. Starting with the slope equation above, this can be re-written in terms of y as follows $$y = \frac{Yb^2 x}{a^2 X + x(b^2 - a^2)}$$

This equation can then be used to develop an equation in terms of x by substituting it into the equation of the ellipse, This yields a fourth order polynomial (a quartic) in x that can be solved to find its two real roots. Once we have the two values of x that solve the equation these can be substituted into the equation of the ellipse in order to get the points in two dimensional space that represent the closest and farthest points on the perimeter of the elliptical uncertainty region from the satellite.

The standard equation of the ellipse is:

$$\frac{x^2}{a^2} + \frac{y^2}{b^2} = 1$$

Substituting y as derived above into this gives:

$$\frac{x^2}{a^2} + \frac{1}{b^2}\left[\frac{Yb^2 x}{a^2 X + x(b^2 - a^2)}\right] = 1$$

This expression can be expanded to get:

$$a^4 X^2 x^2 + 2a^2 X(b^2-a^2)x^3 + (b^2-a^2)^2 x^4 + a^2 Y^2 b^2 x^2 - a^6 X^2 - 2a^4 X(b^2-a^2)x - a^2(b^2-a^2)^2 x^2 = 0$$

Grouping like terms and writing in order of highest order term first gives:

$$x^4 + \frac{2a^2 X}{(b^2-a^2)}x^3 + \frac{a^4 X^2 + a^2 Y^2 b^2 - a^2(b^2-a^2)^2}{(b^2-a^2)^2}x^2 - \frac{2a^4 X}{(b^2-a^2)}x - \frac{a^6 X^2}{(b^2-a^2)^2} = 0$$

This is a quartic equation and can be simplified by factorising the second term to yield the equation:

$$x^4 + \frac{2a^2 X}{(b^2-a^2)}x^3 + \frac{a^2[a^2 X^2 + Y^2 b^2 - (b^2-a^2)^2]}{(b^2-a^2)^2}x^2 - \frac{2a^4 X}{(b^2-a^2)}x - \frac{a^6 X^2}{(b^2-a^2)^2} = 0$$

The general quartic equation can be expressed in the form:

$$z^4 + a_3 z^3 + a_2 z^2 + a_1 z + a_0 = 0$$

If the present quartic is expressed in this fashion the coefficients of the quartic equation are:

$$a_3 = \frac{2a^2 X}{(b^2-a^2)}$$

$$a_2 = \frac{a^2[a^2 X^2 + Y^2 b^2 - (b^2-a^2)^2]}{(b^2-a^2)^2}$$

$$a_1 = \frac{2a^4 X}{(b^2-a^2)}$$

$$a_0 = \frac{a^6 X^2}{(b^2-a^2)^2}$$

We then use these coefficients to solve the quartic equation for the real roots.

Alternatively, it is possible to numerically calculate the slopes at different points on the boundary of the ellipse to find the points that best satisfy the equation.

Once points $(x_1,y_1)$ and $(x_2,y_2)$ have been found, the horizontal uncertainty can be found using:

$$\text{Horizontal uncertainty} = \sqrt{(Y-y_2)^2+(X-x_2)^2} - \sqrt{(Y-y_1)^2+(X-x_1)^2}$$

Using this model a horizontal uncertainty window can be determined and used when determining the range uncertainty for a given satellite, which can readily be translated into a code phase search window when the A-GPS handset is attempting to lock onto a signal from that satellite.

In the case where the uncertainty ellipse is oriented at an angle relative to the direction of the satellite, the point in the horizontal uncertainty region that corresponds to the centre of the code phase search window will not correspond to the centre of the ellipse.

In general there will not be only a single point within the horizontal uncertainty region that corresponds to a point (in 3-Dimensional space) having a code phase off-set that lies at the centre of the code phase window, rather there will be an arc, centred on the satellite, having a radius of $d_4$, where $d_4 = d_1 + d_3$ and $d_3 = (d_3 - d_1)/2$. Any point along this arc can be chosen to correspond to the centre of the code phase search window. The person skilled in the art will be able to readily determine which is the best point on the arc to use in a particular implementation or situation.

In a preferred embodiment the centre of the search window can be chosen to correspond to the point at the intersection of the circle radius $d_4$, and the projection of the line from the satellite to the closest point of intersection $(x_1,y_1)$, which is depicted on FIG. 4 as $(x_3,y_3)$. This point $(x_3,y_3)$ is chosen to keep the values of $x_3$ and $y_3$ small so that before calculating the code phase $x_3$ and $y_3$ can be used as translations in meters in the longitude and latitude respectively from the origin of the ellipse. Alternatively, the point lying on the arc of radius $d_4$ that lies on the line linking the closest point of intersection $(x_1,y_1)$ and the farthest point of intersection $(x_2,y_2)$ can advantageously be chosen.

The mobile terminal is also assigned a vertical position uncertainty in addition to the already calculated horizontal position uncertainty to allow calculation the code phase search window.

The vertical uncertainty or altitude uncertainty can be assigned to the mobile terminal based on the identity of the cell in which the terminal resides. Preferably the terrain of the cell dictates the vertical uncertainty assigned to it. If the terrain within the cell is relatively flat, a low vertical uncertainty will result to the cell, whereas if the terrain is more hilly or has a substantial number of tall buildings then relatively large vertical uncertainty will result.

As will be understood the vertical uncertainty of all, or a subset of the cells within the network could be stored in a database, or alternatively each base station (or other network element) may pass an altitude uncertainty for its cell through the network as needed. More sophisticated embodiment could make use of a timing advance (TA) referenced vertical uncertainty data so that the vertical uncertainties assigned to a mobile terminal is dependent on the TA arc band of the cell in which in which the mobile terminal is operating.

Thus for each mobile terminal operating within the cellular network a horizontal position uncertainty is assigned, eg as described above and a vertical position uncertainty is assigned to the mobile terminal based on which cell of the network the mobile terminal is in communication with. These approximate positions and uncertainty ranges can be used as follows to reduce the code phase search window searched by the satellite when acquiring a satellite signal.

Figure 5:
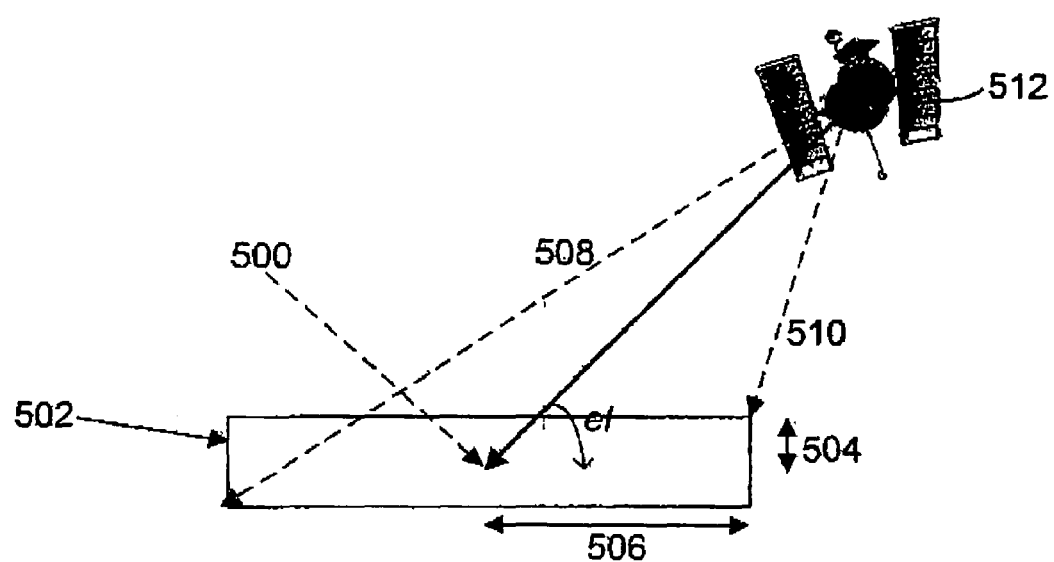
FIG. 5 shows a schematic representation of a volume of uncertainty surrounding an estimated handset location for an A-GPS terminal operating in a cellular telecommunications network.

FIG. 5 shows a vertical cross section through a national 3 dimensional uncertainty value for the handset showing how the horizontal uncertainty and altitude uncertainty for a mobile handset can be used to determine the code phone search window for an A-GPS handset. In FIG. 5 the mobile terminal is estimated to be somewhere within the volume of uncertainty 502. This volume is derived from the altitude uncertainty as indicated at 504 and a horizontal uncertainty as indicated at 506 calculated as described above. For a handset lying within the volume 502, a maximum range to the satellite and a minimum range to the satellite can be determined. As indicated in FIG. 5 the maximum possible range to the handset is indicated by line 508 and represents the distance from the satellite to the bottom corner of the volume of uncertainty 502 at the greatest distance from the satellite 512. The minimum range to the satellite that the mobile terminal can possibly have is indicated on FIG. 5 by the distance 510. This represents the distance between the satellite and the point within the volume of uncertainty which is closest in both the horizontal and vertical directions to the satellite 512.

When viewed in three dimensions, the volume of uncertainty 502 that is shown in FIG. 5 is a cylinder generated by an ellipse that sits on the plane of the surface of the earth. The code phase search window used by the mobile terminal when attempting to match the satellite's signal needs to be large enough to include all of the possible locations within this cylinder. Thus the code phase search window must include code phases corresponding to all possible ranges to the satellite lying between ranges 508 and 510.

The geometrical centre of the code phase search window is indicated by reference numeral 500. This point has a range to the satellite midway between the maximum 502 and minimum range 510.

Figure 6:
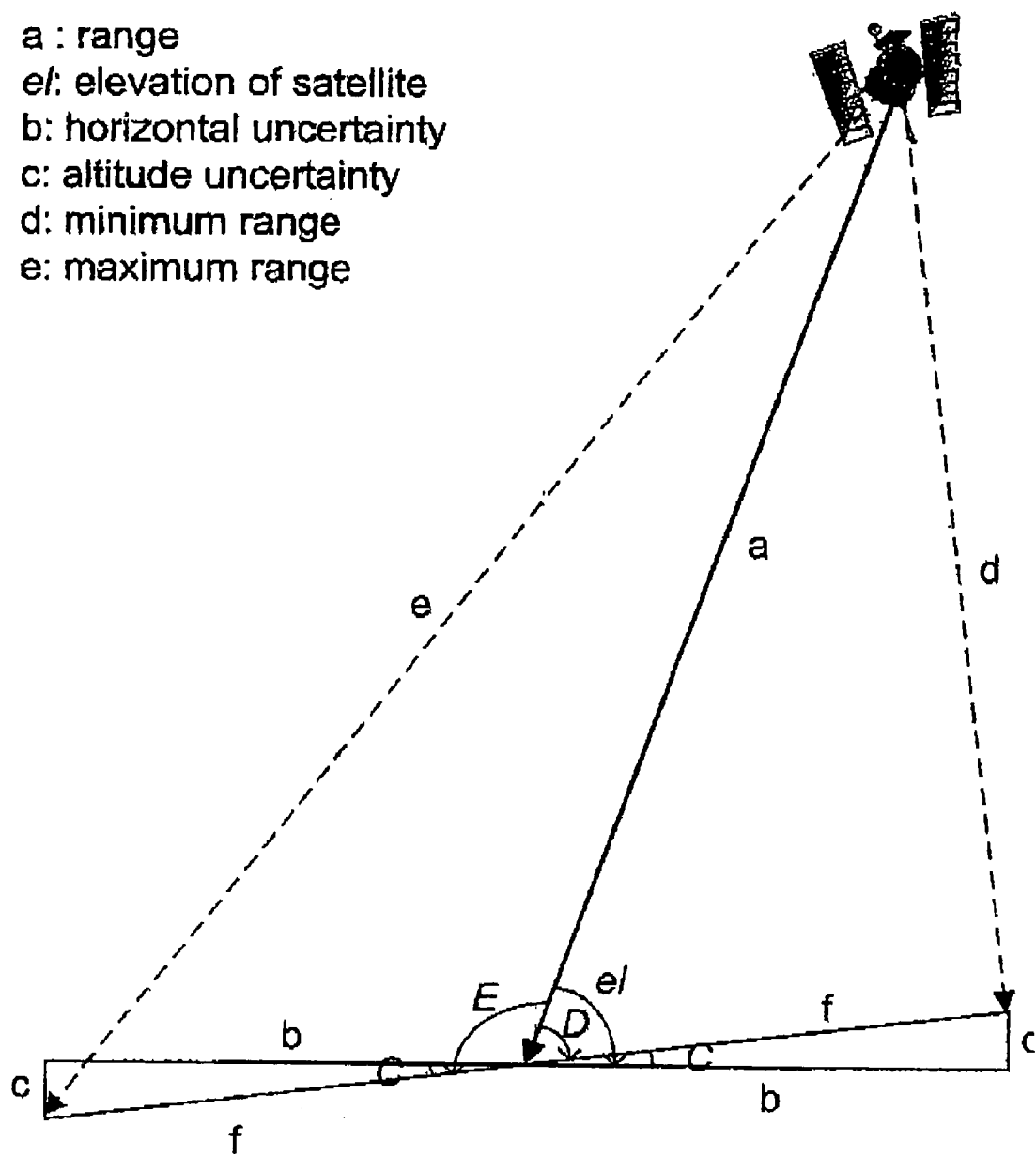
FIG. 6 shows a more detailed view of the diagram of FIG. 5 indicating how the size of the volume of uncertainty can be calculated in an embodiment of the present invention.

Using the geometry shown in FIG. 6, the ranges 508 and 510 can be calculated directly as follows. In the following calculation and in FIG. 6:

a is the estimated range to the satellite;

el is the elevation angle of the satellite;

b is the horizontal uncertainty of the mobile terminal's initial position estimate, and corresponds to 506 of FIG. 5;

c is the altitude uncertainty of the mobile terminal's initial position estimate and corresponds to 504 of FIG. 5;

d is the minimum possible range from the mobile terminal to the satellite and corresponds to 510 of FIG. 5;

e is the maximum range from the mobile terminal to the satellite and corresponds to 508 of FIG. 5;

C, D and E are other derived angles as shown in FIG. 6; and f is the length of the line formed between the estimated handset position and the point in the volume of uncertainty having the minimum possible range to the satellite (or the point in the volume of uncertainty having the maximum possible range to the satellite.)

To calculate d, the Cosine rule can be used once D and f are known. To calculate the angle D, we need to subtract C from el. To get C the trigonometric function:

$$\tan C = \frac{c}{b}$$

is used which gives $$C = a\tan\left(\frac{c}{b}\right)$$

D can then be calculated as follows:

$$D = el - C$$

Using Pythagoras theorem f is calculated as follows:

$$f = \sqrt{b^2 + c^2}.$$

Using the cosine rule, the range d is determined by:

$$d = \sqrt{a^2 + f^2 - 2af\cos D}$$

To calculate e, the angle E is first calculated using:

$$E = (180 - el) + C$$

The maximum possible range to the satellite e can then be calculated using the cosine rule as follows:

$$e = \sqrt{a^2 + f^2 - 2af\cos E}$$

The size of the code phase search window can then be calculated by subtracting the minimum range d from the maximum possible range e. The size of the code phase search window is the possible range difference divided by the resolution of a chip (in terms of distance) divided by 2. The division by 2 is necessary because the mobile handset searches on each side of a code phase position corresponding to the central point in the range.

The central point in the code phase search window can be determined in a number ways. For example, the point in the horizontal uncertainty region that corresponds to the centre of the code phase search window can be determined as described in connection with FIG. 4 and the vertical centre of the uncertainty region depicted in FIG. 5 is known as described above accordingly, point 500 in the volume of uncertainty the corresponds to the centre of the code phase search window can be determined relatively easily. Accordingly the range to the satellite and its corresponding code phase offset could be determined by those skilled in the art.

Alternatively, given that the width of the code phase search window is known and its offset is also known the central code phase in the search window can be determined without reference to the underlying geometry by finding the code phase which lies midway between the code phase corresponding to the points 508 and 510 of FIG. 5.

Thus the code phase search window can be represented as follows:

$$W = \frac{\left(\frac{(d-e)}{r_{CA}}\right)}{2}$$

where W is the code phase search window, and $r_{CA}$ is the resolution of a chip. As will be known to a person skilled in the art the chipping rate of a GPS satellite signal is 1023 kilohertz giving a resolution of approximately 293 meters.

The method of calculating a code phase window described above will typically be implemented in one of the network elements of the cellular telecommunications network such as a mobile location centre. The code phase window data derived from the process will then typically be transmitted via the cellular telecommunications network to A-GPS receiver in order to allow acquisition of the satellite signal. As will be appreciated by those skilled in the art the process described above will be repeated for each of the satellites of the satellite positioning system constellation that are visible to the satellite positioning system receiver of the mobile handset to locate its position.

In alternative embodiments of the present invention alternative initial position estimates could be used to narrow the code phase search window as shown in the examples depicted in FIGS. 7 to 10.

In this regard, certain types of radio communications networks are capable of reporting communications parameters for a mobile terminal operating within the network. Some of these parameters can be used to derive initial position estimates for use in an embodiment of the present invention.

Figure 7:
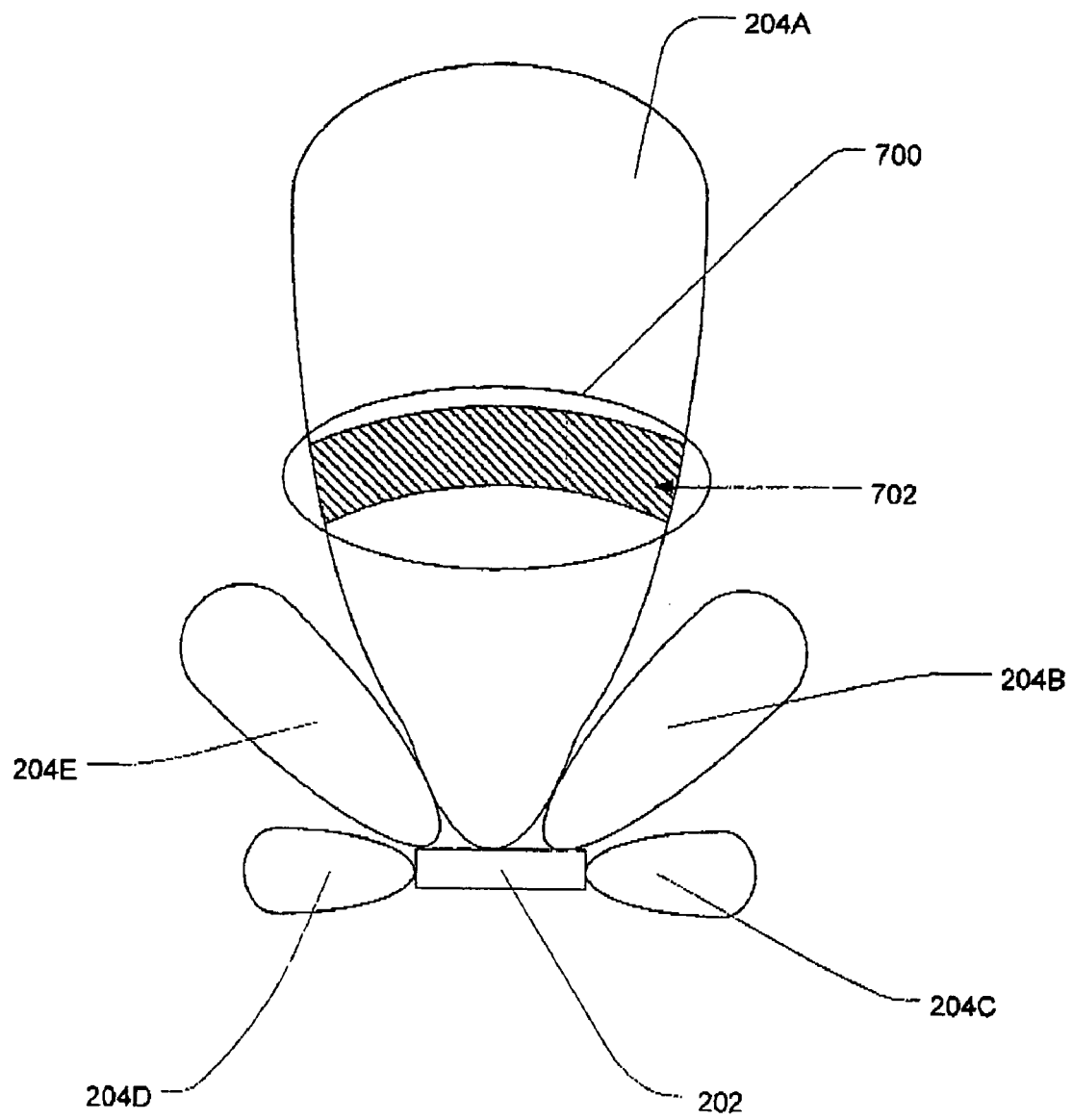
FIG. 7 depicts an ellipse representing an initial position estimate for a handset in a cellular telecommunications network aged in another embodiment of the present invention.

FIG. 7 depicts an ellipse representing an initial position uncertainty region 700 assigned to a satellite positioning system receiver operating in a cellular telecommunications network. In this embodiment timing advance data obtained for the mobile terminal is used to estimate the range of the mobile terminal from the base station 202 of the cell. The timing advance (TA) data for the mobile terminal shows that the handset lies at a point within an arc band 702. As will be appreciated the arc band 702 represents that area within the base station's 202 transmission envelope 204A . . . 204E having a timing advance similar to that of the mobile terminal.

In this embodiment the no-n-circular horizontal position uncertainty region 700 is assigned to the mobile terminal on the basis of the TA and cell identity information, so as to encompass all positions within the arc band 702. The non-circular horizontal position uncertainty region 700 is preferably elliptical to aid in calculating the code phase search window.

Figure 8A:
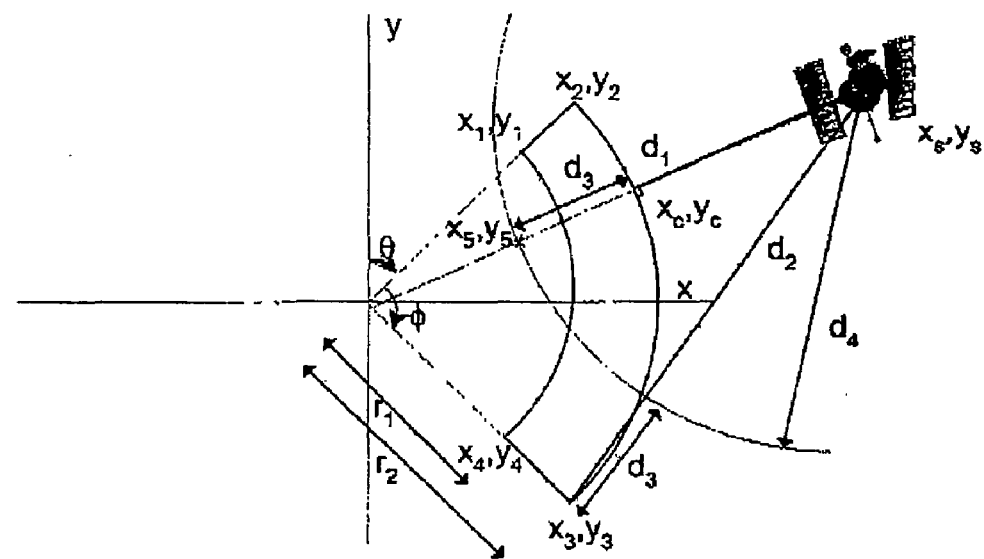
FIGS. 8A and 8B show an arc band, with an acute included angle, that is used as tan initial position estimate for a handset in a cellular telecommunications network in another embodiment of the present invention.
Figure 8B:
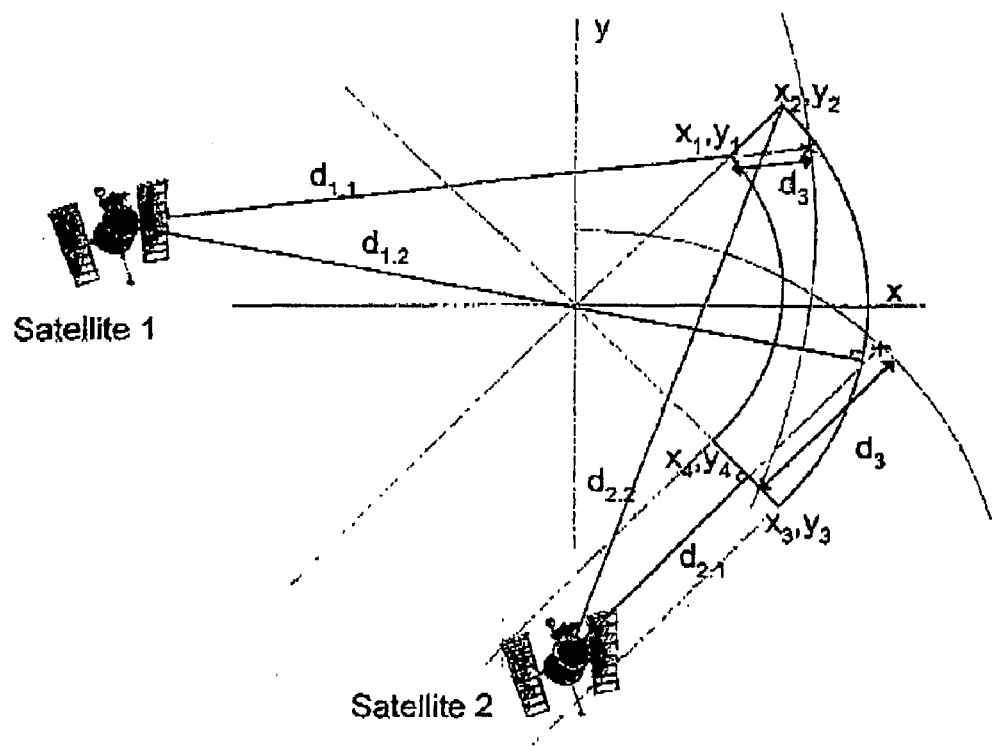
Figure 9A:
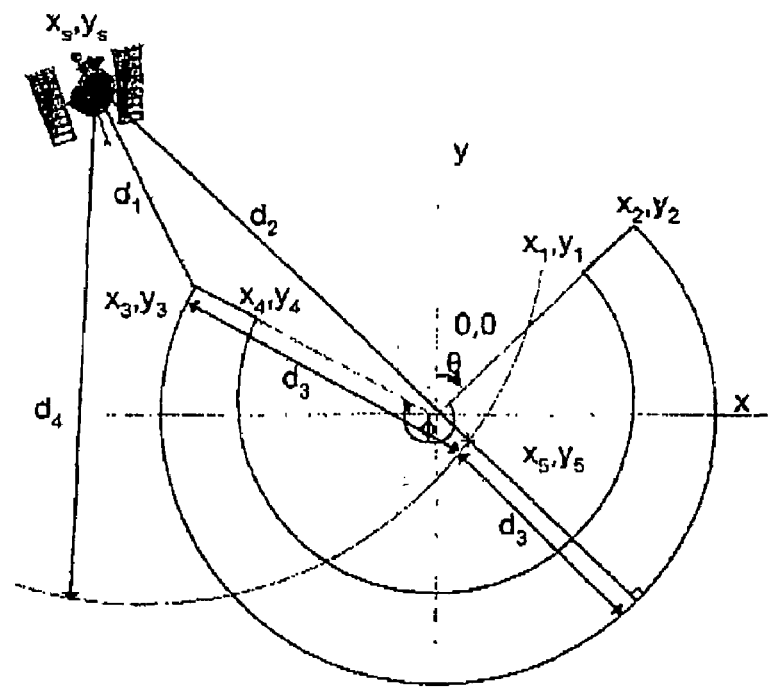
FIGS. 9A and 9B show an arc band, with an obtuse included angle, that is used as an initial position estimate for a handset in, a cellular telecommunications network in another embodiment of the present invention.
Figure 9B:
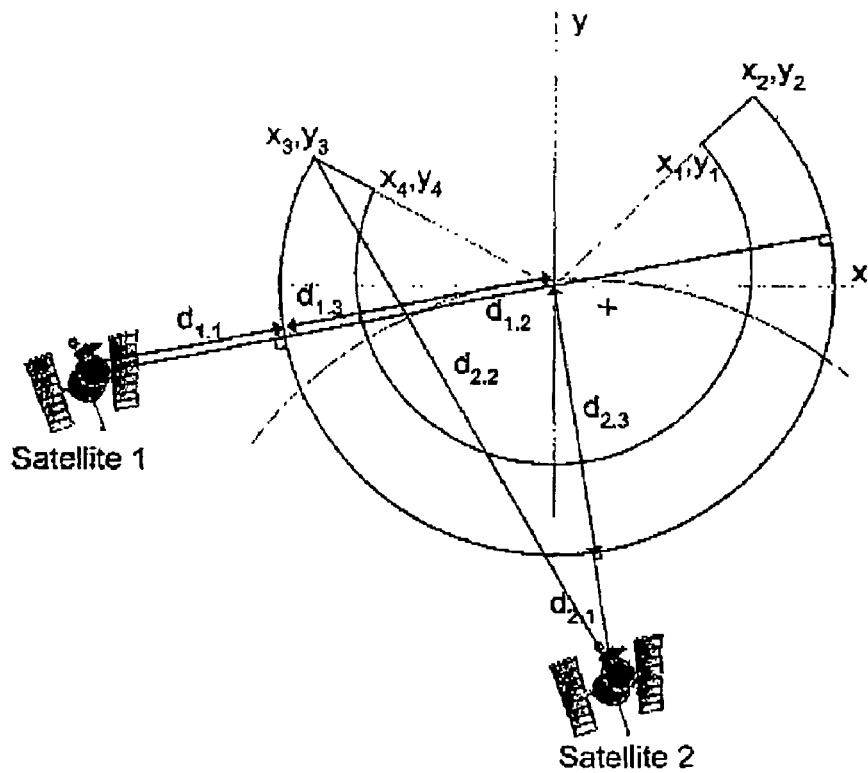

FIGS. 8A to 9B will be used to explain a method of calculating the code phase search window for arc-shaped horizontal position uncertainty regions. FIGS. 8A and 8B depict an arc band with an acute included angle, and FIGS. 9A and 9B depict an arc band with an obtuse included angle.

In FIGS. 8A and 8B the position of the satellite is projected onto a two-dimensional plane. In this projection the position of the satellite is $(x_s, y_s)$ and the mobile terminal being located is in communication with a base station at the origin (0,0) of the coordinate system. In FIGS. 8A and 8B the following labelling convention is followed:

$x_s, y_s$ the location of a satellite projected on a two-dimensional plane;

(0,0) the location of the base station;

θ the angle between the "north" of the coordinate system and the start of the segment, and is termed the "offset angle";

ϕ the opening of the segment, referred to as the "included angle";

$r_1$ the range from the base station to the inner arc;

$r_2$ the range from the base station to the outer arc;

$(x_1, y_1)$ to $(x_4, y_4)$ are the points at the corners of the arc band;

$d_1$ the distance between the point on the perimeter of the arc band closest to the satellite and the satellite;

$d_2$ the distance between the point on the perimeter of the arc band farthest from the satellite and the satellite;

$d_3$ this is horizontal uncertainty $(d_2-d_1)/2$;

$d_4$ is the distance from the satellite to the centre of the search window $d_4=d_1+d_3$; and $(X_c, Y_c)$ is the closest point on the arc band to the satellite when the satellite is within the included angle.

The arc band is fully specified by the location of the base station (0,0), the offset angle θ to the satellite from the coordinate system, the included angle ϕ, the radius to the inner arc $r_1$ and the radius to the outer arc $r_2$.

The horizontal uncertainty $d_3$ is calculated by taking the midpoint between points on the perimeter of the arc band that are nearest $d_1$ and furthest $d_2$ from the satellite. The centre of the search window $(x_5, y_5)$ is a point at a distance $d_4$ from the satellite, where $d_4$ is equal to the minimum horizontal distance to the satellite plus the horizontal uncertainty, i.e. $d_1+d_3$.

Since the code phase is a function of the range to a satellite only, the centre of the search window could lie anywhere on a circle centred at the satellite having a radius of $d_4$. The inventor has found that an advantageous location to choose for the centre of the search window, i.e. the initial position estimate, indicated as $(x_5, y_5)$ on FIG. 8A is at the intersection of the circle, centred on the position of the satellite with the radius d4 and the projection of the line $d_1$. This keeps to values of $x_5$ and $y_5$ small so that before calculating the code phase, $x_5$ and $y_5$ can be used as translations in meters in the longitude and latitude directions respectively from the origin of the arc band.

The closest distance from the arc band to the satellite $d_1$ depends on the angular position of the satellite. If $(x_s, y_s)$ is within the included angle as shown in FIG. 8A, the closest point on the arc band $(x_c, y_c)$ is the point on outer arc that is closest to the satellite. This is the point where the line from the base station or origin to the satellite cuts the outer arc and can be calculated using:

$$x_c = r_2 \cos\left(a\tan\left(\frac{y_s}{x_s}\right)\right)$$

$$y_c = r_2 \sin\left(a\tan\left(\frac{y_s}{x_s}\right)\right)$$

In this case the furthest point from the satellite to the arc band will be a point at one of the "corners" of the arc band. The points at the corners of the arc $(x_1,y_1)$, $(x_2,y_2)$, $(x_3,y_3)$, and $(x_4,y_4)$ can be calculated as follows:

$$x_1 = r_1 \sin \theta$$

$$y_1 = r_1 \cos \theta$$

$$x_2 = r_2 \sin \theta$$

$$y_2 = r_2 \cos \theta$$

$$x_3 = r_2 \sin (\theta+\phi)$$

$$y_3 = r_2 \cos (\theta+\phi)$$

$$x_4 = r_1 \sin (\theta+\phi)$$

$$y_4 = r_1 \cos (\theta+\phi)$$

In the event that the satellite $(x_s,y_s)$ is within the included angle of the arc band plus 180 degrees as is the case for Satellite 1 shown in FIG. 8B, the point on the perimeter of the arc band that is nearest point to the satellite is either $(x_1,y_1)$ or $(x_4,y_4)$ and the furthest point is where the line from the satellite though the base station (or origin) intersects with the outer arc of the arc band.

If the satellite $(x_5,y_5)$ is not within the include angle, as is the case for Satellite 2 shown in FIG. 8B then the points on the perimeter of the arc band that are the nearest and farthest to and from the satellite, will be the corners of the arc band, except where the satellite is closer to the "end" of the arc band. This is the case for Satellite 2 in FIG. 2 of FIG. 8B. In this case the distance $d_{2.1}$ can be determined using the standard method of finding the perpendicular distance between a line a point.

A similar method also applies if the included angle of the arc band is obtuse as shown in FIGS. 9A and 9B. In FIGS. 9A and 9B the same labelling convention is used as for FIGS. 8A and 8B.

FIG. 9A shows the situation where the satellite is outside the included angle of the arc band and FIG. 9B shows two cases where the satellite is within the included angle of the arc band. In one case in FIG. 9B the near and far points to the satellite lie across a diameter of the arc band, whereas in the other case, the points are offset with respect to one another because the most distant point between the satellite and the perimeter of the arc band is one of the corners of the arc band.

Turning firstly to FIG. 9A, in which the satellite falls outside the included angle of the arc band. In this case the closest point to the satellite on the perimeter of the arc band (which defines $d_1$) is the nearest corner of the arc band to the satellite, and can be found using the appropriate equation for the corner of interest as listed above. The point on the perimeter of the arc band (which defines $d_2$) which is furthest from the satellite is the point on the arc diametrically opposite the satellite's location, through the origin (base station) of the coordinate system.

In FIG. 9B, the position of the satellite when projected into two dimensions $(x_s,y_s)$ is within the included angle of the arc. In this situation the closest point to the satellite on the perimeter of the arc band (which defines $d_{1.1}$ and $d_{2.1}$) lies on the line from the origin to the satellite.

In the case where the satellite lies within the included angle plus 180 degrees, as is the case for Satellite 2 of FIG. 9B the point on the perimeter of the arc band (which defines $d_{2.2}$) which is furthest from the satellite is one of the corners of the outer arc, that is $(x_2,y_2)$ or $(x_3,y_3)$, the position of which can be found as described above. Alternatively if the satellite lies outside this region as does Satellite 1 then the point on the perimeter of the arc band (which defines $d_{1.2}$) which is furthest from the satellite is the point on the arc diametrically opposite the satellite's location, through the origin.

If the projection of the satellite into two-dimensions lies between the origin and the arc and within the included angle, then the nearest point will be on the inside arc at the point on the radius from the origin through the satellite crosses the inside arc. The furthest point will be either $(x_2,y_2)$ or $(x_3,y_3)$.

In the event that the projection of the satellite down to two dimensions $(x_s,y_s)$ is within the bounds of the arc band, the horizontal uncertainty can be calculated as follows. First the geometric centre of the arc is calculated by taking the average of the four "corner" coordinates of the arc—$(x_1,y_1)$ to $(x_4,y_4)$. This point at the centre will be $(x_5,y_5)$. The horizontal uncertainty is then the maximum of the distance between this point $(x_5,y_5)$ and each of the "corner" points." Note that in this situation, the horizontal uncertainty has a minimal effect on the size of the search window since the satellite is directly overhead This algorithm will also hold when the shape type is a sector, that is, $r_1$ is 0.

The centre point of the search window $(x_5,y_5)$ can be determined as described above.

In certain networks a polygonal position uncertainty can be reported. The polygon consists of a series of points that define an uncertainty area in which the mobile terminal may reside. In this case the horizontal certainty region is calculated similarly to the other shapes in so far as that it is performed by calculating the point nearest to the satellite and the point furthest from the satellite to give the horizontal uncertainty.

Figure 10:
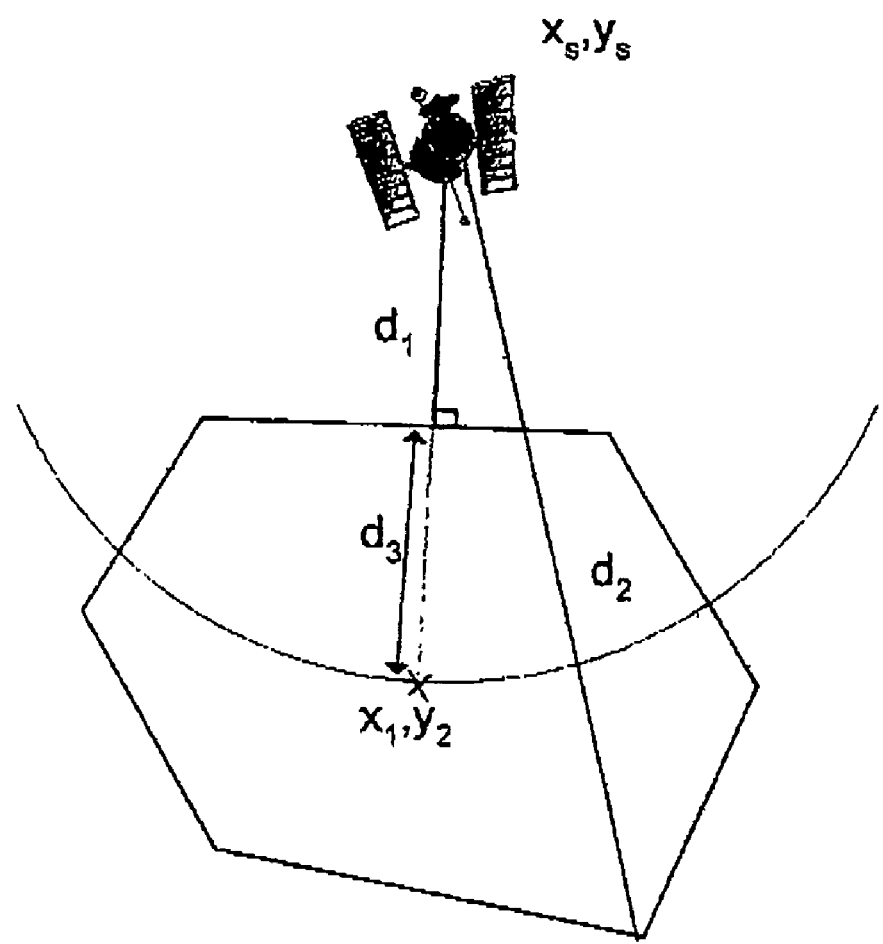
FIG. 10 shows a polygon used as an initial position estimate for a handset in a cellular telecommunications network in another embodiment of the present invention.

An example is shown in FIG. 10, in which the mobile terminal of the radio communications network can be at any place within the polygon shown. To find the closest point on the perimeter of the polygon to the satellite, and hence length d1 and furthest point on the perimeter of the polygon from the satellite, and hence $d_2$, we use the standard method to find the distance from a point $(x_5,y_5)$ to a line segment for each of the line segments defining the polygon.

For a polygonal initial position estimate the shortest or longest distances will either be the perpendicular distance to one of the sides of the polygon or the distance to one of the corners of the polygon. In the example shown in FIG. 10, the shortest distance $d_1$ is a point on one of the sides of the polygon, and the longest distance $d_2$ is to one of the corners of the polygon. As described above the centre of the search window $d_3$ lies equidistant from $d_1$ and $d_2$.

In certain networks it may be possible to obtain three-dimensional position estimates for a mobile terminal directly, rather than creating them from a horizontal and vertical uncertainty. For example it is possible to obtain an ellipsoidal initial position estimate for a mobile terminal of a certain cellular telecommunications networks.

For a three dimensional shape the process for determining the code phase search can be simplified somewhat compared to the previous geometries. That is, rather than having to calculate the nearest and farthest points within the horizontal uncertainty region and then add a vertical uncertainty, the calculation of the nearest and farthest points, to and from the satellite within the ellipsoid can be calculated directly.

The uncertainty ellipsoid is a quadratic surface with an equation given by $$\frac{x^2}{a^2} + \frac{y^2}{b^2} + \frac{z^2}{c^2} = 1$$

and the closest and furthest points between the ellipsoid and the satellite at (X,Y,Z) are used directly to define the size of the search window. These are the two points on the ellipsoid where the line from satellite to the ellipsoid is normal to the surface of the ellipsoid. The initial estimated position of the handset is a point that is equidistant from the nearest and farthest point from the satellite It should be appreciated that the present method can be applied to a range of cellular telecommunications network including, but not limited to, UMTS, GSM and CDMA networks. A person skilled in the art will understand how the above described process for calculating a code phase search window can be implemented in any one of these cellular telecommunication networks.

It will be understood that the invention disclosed and defined herein extends to all alternative combinations of two or more of the individual features mentioned or evident from the text or drawings. All of these different combinations constitute various alternative aspects of the invention.

The foregoing describes embodiments of the present invention and modifications can be made thereto, without departing from the scope of the present invention. For example, rather than communicating the assistance data over a cellular telecommunication network the assistance data could be transmitted to the satellite positioning system receiver using any wireless communications network, e.g. an 802.11 wireless network. Such an embodiment may be advantageously applied in an enterprise-level inventory/equipment tracking system, for example for tracking shipping containers in a shipping yard. In such an implementation each shipping container in the yard is fitted with a satellite positioning system receiver that is associated with a computer device that is in communication with an 802.11 wireless network covering the shipping yard. When the position of one of the containers it to be determined, assistance data can be transmitted to the positioning system receiver of the container via the 802.11 network to assist with satellite signal acquisition. The transmission/reception footprint of the particular 802.11 antenna with which the container is in communication, can form the basis of the initial position estimate for the container. Advantageously such an implementation may speed up signal acquisition and hence position reporting and allow signal acquisition whether a container is in an open yard, in a warehouse or closely surrounded by other containers.

The invention claimed is:

1. A method of determining a code phase search window for use by a satellite positioning system receiver associated with a mobile terminal of wireless communications network when acquiring a signal from a satellite of a satellite positioning system, including:
    determining an approximate position of the satellite positioning system receiver having an non-circular position uncertainty region associated therewith;
    determining a minimum range to the satellite for a mobile terminal within the position uncertainty region;
    determining a maximum range to the satellite for a mobile terminal within the position uncertainty region;
    determining the code phase search window for use by the satellite positioning system receiver that includes a code phase interval encompassing code phase values corresponding to the minimum and maximum ranges to the satellite; and
    determining a location for the satellite positioning system receiver as a function of the code phase search window;
    wherein the uncertainty region is determined on the basis of at least a transmission pattern of a transmitter of the communications network with which the mobile terminal is in communication.

2. The method of claim 1 further including; deriving at least one of the approximate position of the satellite positioning system receiver, and the non-circular position uncertainty region associated therewith from radio communications parameter data associated with the mobile terminal.

3. The method of claim 2 wherein the radio communication parameter data associated with the mobile terminal is a timing advance (TA) data.

4. The method of claim 3 further comprising using the TA data to estimate the range of the mobile terminal from the transmitter of the communication network with which the mobile terminal is in communication.

5. The method of claim 3 wherein the radio communication network is a GSM network.

6. The method of claim 1 wherein the method further includes, determining a point within the non-circular position uncertainty region that is closest to the satellite.

7. The method of claim 1 wherein the method further includes, determining a point within the non-circular position uncertainty region that is farthest from the satellite.

8. The method of claim 1 further including determining a midpoint for the uncertainty region which lies equidistant from the point within the non-circular position uncertainty region that is closest to the satellite and the point within the non-circular position uncertainty region that is farthest from the satellite.

9. The method of claim 8 wherein determining a midpoint for the code phase search window by determining the code phase of a point having a range to the satellite that is halfway between the minimum range to the satellite and the maximum range for a mobile terminal within the uncertainty region.

10. The method claim 1 in which the position uncertainty region is a three dimensional region.

11. The method of claim 1 in which the position uncertainty region is defined by a two dimensional position uncertainty region and a vertical position uncertainty.

12. The method of claim 1 wherein the non-circular uncertainty region assigned to the approximate position is selected from a list including: an elliptical region, an ellipsoid, a polygonal region, an arc band.

13. The method of claim 11 wherein the vertical uncertainty is assigned on the basis of the topology of the two dimensional uncertainty region.

14. The method of claim 1 further comprising transmitting the code phase search window to the satellite positioning system receiver.

15. The method of claim 1 wherein the transmission pattern is the beam pattern of an antenna of the transmitter.

16. A method, in a satellite positioning system receiver associated with a mobile terminal of a wireless communications network, of determining a code phase offset between a locally generated encoded signal and an encoded signal received from a satellite of the satellite positioning system, the method comprising:
comparing the phase of the locally generated encoded signal to the received signal for a plurality of the code phase offsets in a code phase search window until a phase match is identified; and determining a location for the satellite positioning system receiver as a function of the code phase search window;
wherein the code phase search window is determined on the basis of an approximate position of the satellite positioning system receiver and an associated a non-circular position uncertainty region and is representative of a range of possible code phase offsets for a terminal located in said non-circular position uncertainty region;
wherein the uncertainty region is determined on the basis of at least a transmission pattern of a transmitter of the communications network with which the mobile terminal is in communication.

17. The method of claim 16 wherein the code phase search window is determined by; determining a minimum range to the satellite for a mobile terminal within the position uncertainty region; determining a maximum range to the satellite for a mobile terminal within the position uncertainty region; determining a code phase search window for use by the satellite positioning system receiver that includes a code phase interval encompassing code phase values corresponding to the minimum and maximum ranges to the satellite.

18. The method of claim 16 further including, deriving at least one of the approximate position of the satellite positioning system receiver, and the non-circular position uncertainty region associated therewith from radio communications parameter data associated with the mobile terminal.

19. The method of claim 16 in which a midpoint for the code phase search window is determined by determining the code phase of a point having a range to the satellite that is halfway between a point within uncertainty region having a minimum range to the satellite and a point within uncertainty region having a maximum range to the satellite.

20. The method of claim 16 in which the position uncertainty region is a three dimensional region.

21. The method of claim 16 in which the position uncertainty region is defined by a two-dimensional position uncertainty region and a vertical position uncertainty.

22. The method of claim 21 wherein the vertical uncertainty is assigned on the basis of the topology of the two-dimensional uncertainty region.

23. The method of claim 16 wherein the non-circular uncertainty region assigned to the approximate position is selected from a list including: an elliptical region, an ellipsoid, a polygonal region, an arc band.

24. The method of claim 16 wherein the code phase search window is transmitted to the satellite positioning system receiver by the radio communications network.

25. A method of assisting a satellite positioning system receiver associated with a mobile terminal operating in a wireless communications network to determine a code phase offset between an encoded signal generated in the receiver and an encoded signal received from a satellite of the satellite positioning system, the method including:
determining, on the basis of an approximate position of the mobile terminal and an associated a non-circular uncertainty region, a code phase search window; communicating the determined code phase search window to the receiver;
wherein the uncertainty region is determined on the basis of at least a transmission pattern of a transmitter of the communications network with which the mobile terminal is in communication.

26. The method of 25 wherein the code phase search window is determined by; determining a minimum range to the satellite for a mobile terminal within the position uncertainty region; determining a maximum range to the satellite for a mobile terminal within the position uncertainty region; determining a code phase search window for use by the satellite positioning system receiver that includes a code phase interval encompassing code phase values corresponding to the minimum and maximums ranges to the satellite.

27. The method of claim 25 further including, deriving at least one of the approximate position of the satellite positioning system receiver, and the non-circular position uncertainty region associated therewith from radio communications parameter data associated with the mobile terminal.

28. The method of claim 27 wherein the radio communication parameter data associated with the mobile terminal is a timing advance (TA) data.

29. The method of claim 28 further comprising using the TA data to estimate the range of the mobile terminal from the transmitter of the communication network with which the mobile terminal is in communication.

30. The method of claim 27 wherein the radio communication network is a GSM network.

31. The method of claim 25 in which a midpoint for the code phase search window is determined by determining the code phase of a point having a range to the satellite that is halfway between a point within uncertainty region having a minimum range to the satellite and a point within uncertainty region having a maximum range to the satellite.

32. The method of claim 25 in which the position uncertainty region is a three dimensional region.

33. The method of claim 25 in which the position uncertainty region is defined by a two dimensional position uncertainty region and a vertical position uncertainty.

34. The method of claim 33 wherein the vertical uncertainty is assigned on the basis of the topology of the two-dimensional uncertainty region.

35. The method of claim 25 wherein the non-circular uncertainty region assigned to the approximate position is selected from a list including: an elliptical region, an ellipsoid, a polygonal region, an arc band.

36. The method of claim 25 wherein data representative of the determined code phase search window is transmitted via the cellular telecommunications network for use by the satellite positioning system receiver.

37. The method of claim 25 wherein the code phase search window is determined by a network element of the cellular telecommunications network.

38. The method of claim 37 wherein at least one of the non-circular uncertainty region are determined for the mobile terminal by a second network element.

39. The method of claim 25 wherein the transmission pattern is the beam pattern of an antenna of the transmitter.

40. A network element of a communications network configured to determine a code phase search window for use by a satellite positioning system receiver associated with a mobile terminal operating within the communications network, wherein the network element is configured to determine a code phase search window on the basis of: an approximate position assigned to the satellite positioning system receiver having a non-circular position uncertainty region associated wherewith;

wherein the uncertainty region is determined on the basis of at least one of a transmission pattern of a transmitter of the communications network.

41. The network element of claim 40 wherein the network element is a mobile location centre of a cellular telecommunications network.

42. The network element of claim 40 which is further includes transmission means configured to communicate data representative of the code phase search window to the satellite positioning system receiver via the communications network.

43. The network element of claim 40 wherein the transmission pattern is the beam pattern of an antenna of the transmitter.

44. A communication network including a network element as claimed in claim 40.

45. A communication network as claimed in claim 44 wherein the network is one of the following types of network: Global System for Mobile (GSM) network, code-division multiple access (CDMA) network, Universal Mobile Telecommunications Service (UMTS) network.

46. A network element of a communications network including; a processor configured to determine a code phase search window for use by a satellite positioning system receiver associated with a mobile terminal operating within the communications network, the processor being configured to determine a code phase search window on the basis of: an approximate position assigned to the satellite positioning system receiver; a non-circular position uncertainty region associated with the approximate position; and transmission means configured to transmit data representative of the code phase search window to the mobile terminal via the communications network; wherein the uncertainty region is determined on the basis of a transmission pattern of a transmitter of the communications network associated with the mobile terminal.

47. The network element of claim 46 including reception means configured to receive data from the communication network from which the approximate position assigned to the satellite positioning system receiver and a non-circular position uncertainty region can be derived.

48. The network element of claim 46 further including memory means configured to store thereon a database structure including vertical position uncertainty data useable by the processor to determine a code phase search window for a mobile terminal.

49. The network element of claim 46 wherein the network element is a mobile location centre of a cellular telecommunications network.

50. The network element of claim 46 wherein the transmission pattern is the beam pattern of an antenna of the transmitter.

51. A communication network including a network element as claimed in claim 46.

52. A communication network as claimed in claim 51 wherein the network is one of the following types of network; Global System for Mobile (GSM) network, code-division multiple access (CDMA) network, Universal Mobile Telecommunications Service (UMTS) network.

53. A method of determining a code phase search window for use by a satellite positioning system receiver associated with a mobile terminal of wireless communications network when acquiring a signal from a satellite of a satellite positioning system, the method comprising determining the code phase search window based on an approximate position of the satellite positioning system receiver and an associated non-circular uncertainty region surrounding the approximate position, and determining a location for the satellite positioning system receiver as a function of the uncertainty region;

wherein the uncertainty region is determined on the basis of at least a transmission pattern of a transmitter of the communications network with which the mobile terminal is in communication.

54. The method of claim 53 further including, deriving at least one of the approximate position of the satellite positioning system receiver, and the non-circular position uncertainty region associated therewith from radio communications parameter data associated with the mobile terminal.

55. The method of claim 53 wherein a midpoint for the code phase search window is determined by determining the code phase of a point having a range to the satellite that is halfway between the minimum range to the satellite and the maximum range for a mobile terminal within the uncertainty region.

56. The method of claim 53 in which the position uncertainty region is a three dimensional region.

57. The method of claim 53 in which the position uncertainty region is defined by a two dimensional position uncertainty region and a vertical position uncertainty.

58. The method of claim 57 wherein the vertical uncertainty is assigned on the basis of the topology of the two-dimensional uncertainty region.

59. The method of claim 53 wherein the non-circular uncertainty region assigned to the approximate position is selected from a list including: an elliptical region, an ellipsoid, a polygonal region, an arc band.

60. The method of claim 53 further comprising transmitting the code phase search window to the satellite positioning system receiver.

61. The method of claim 53 further comprising receiving data representative of at least one of, the approximate position of the satellite positioning system receiver, and the non-circular uncertainty region associated therewith.

62. The network element of claim 52 wherein the transmission pattern is the beam pattern of an antenna of the transmitter.

* * * * *